United States Patent
Bergere et al.

(10) Patent No.: US 6,895,876 B2
(45) Date of Patent: May 24, 2005

(54) SEED DRILL ELEMENT HAVING IMPROVED TOPSOILING MEANS

(75) Inventors: Dominique Bergere, Bressuire (FR); Gilles Petraud, Moncoutant (FR)

(73) Assignee: Ribouleau Monosem, Largeasse (FR)

(*) Notice: Subject to any disclaimer, the term of this patent is extended or adjusted under 35 U.S.C. 154(b) by 0 days.

(21) Appl. No.: 10/391,120

(22) Filed: Mar. 18, 2003

(65) Prior Publication Data

US 2003/0183141 A1 Oct. 2, 2003

(30) Foreign Application Priority Data

Mar. 26, 2002 (FR) .............................. 02 03785

(51) Int. Cl.[7] ............................................. A01C 7/20
(52) U.S. Cl. ....................................... 111/134; 111/195
(58) Field of Search ................... 111/134–137, 186–194, 111/52, 77, 69, 73, 151, 154, 155, 195, 196; 172/142, 169, 175, 195, 643, 657, 684, 748, 734

(56) References Cited

U.S. PATENT DOCUMENTS 3,880,100 A  4/1975 Gillies et al.
4,135,457 A  1/1979 Willis
4,148,266 A * 4/1979 Weitz .......................... 111/136
4,374,500 A  2/1983 Westerfield
4,750,441 A * 6/1988 Pfenninger et al. .......... 111/135

FOREIGN PATENT DOCUMENTS

GB           766040           1/1957

* cited by examiner

Primary Examiner—Robert E Pezzuto
(74) Attorney, Agent, or Firm—Welsh & Katz, Ltd.

(57) ABSTRACT

The seed drill element comprises a frame, a seed tank, a seed dispenser, and a member for opening a furrow in the ground. The seed drill element further comprises mechanism for bearing against the ground, having a rear block and/or a front block, with each block having at least one wheel and an arm hinged to the frame, and also topsoiling mechanism including a rear link, two front links, and an intermediate link. The topsoiling mechanism also comprise a mechanism for moving the rear link relative to a reference part connected to the frame. In addition, the seed drill element includes a locking mechanism so that the topsoiling mechanism can be configured for front topsoiling, for rear topsoiling, and/or for rocker topsoiling.

11 Claims, 9 Drawing Sheets

SEED DRILL ELEMENT HAVING IMPROVED TOPSOILING MEANS

The present invention relates to a seed drill element.

BACKGROUND OF THE INVENTION

Such seed drill elements are designed to be mounted either individually or as a group on a chassis, itself pulled by an agricultural tractor.

The invention applies in particular to sowing seeds one at a time, in particular for cultivating maize (corn), beet, and sunflowers, whose seeds need to be put into the ground individually, and they need to be spaced apart with predetermined spacing.

One of the important parameters for good sowing is the depth at which seeds are buried in the ground, i.e. the distance between the surface of the ground and the seed. In agriculture, this depth at which the seed is buried can be referred to as the "topsoiling" (or covering) depth. In addition, there are three different topsoiling techniques depending on whether the weight of the seed drill element is supported mainly in front of the furrow-opening zone, mainly behind said zone, or both in front and behind said zone by means of a rocker structure.

For this purpose, modern seed drill elements are thus provided with topsoiling means designed to implement each topsoiling technique and to impose a substantially constant depth of furrow depending on the nature, the firmness, and the surface irregularities of the ground being sown.

At present, some such topsoiling means are in the form of a micrometer screw which causes the arm holding the front or rear wheel to move towards or away from the frame of the element so as to decrease or increase the difference in height between the bottom face of the furrow-opening member and the level of the front or rear wheel pressed against the ground. This can be referred as topsoiling depth being set by the front or the rear wheel(s).

When topsoiling depth is determined by a rocker, i.e. by co-operation between a front block and a rear block, the means for setting topsoiling depth often comprise a handle for adjusting the length of the intermediate link in such a manner as to adjust the difference in height between the front wheel(s) and the rear wheel(s) so as to set the height of the furrow-opening coulter, thereby adjusting the depth to which the furrow-opening member penetrates into the ground.

All of those means for adjusting topsoiling depth are lengthy to adjust and difficult to reproduce from one seed drill element to another, which means that it is not possible to guarantee uniform topsoiling for a group of seed drill elements all mounted on the same drive chassis.

OBJECT AND SUMMARY OF THE INVENTION

The object of the present invention is to provide a seed drill element of the above-defined type which makes it equally possible to adjust topsoiling depth either by means of the front wheel(s), or by means of the rear wheel(s), or else by means of a rocker, in a manner that is easy and accurate, and that provides excellent repeatability.

For this purpose, the invention provides a seed drill element of the above-specified type and possessing the characteristics of claim 1.

Other characteristics of this seed drill element, taken in isolation or in any technically feasible combination are defined in the dependent claims.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
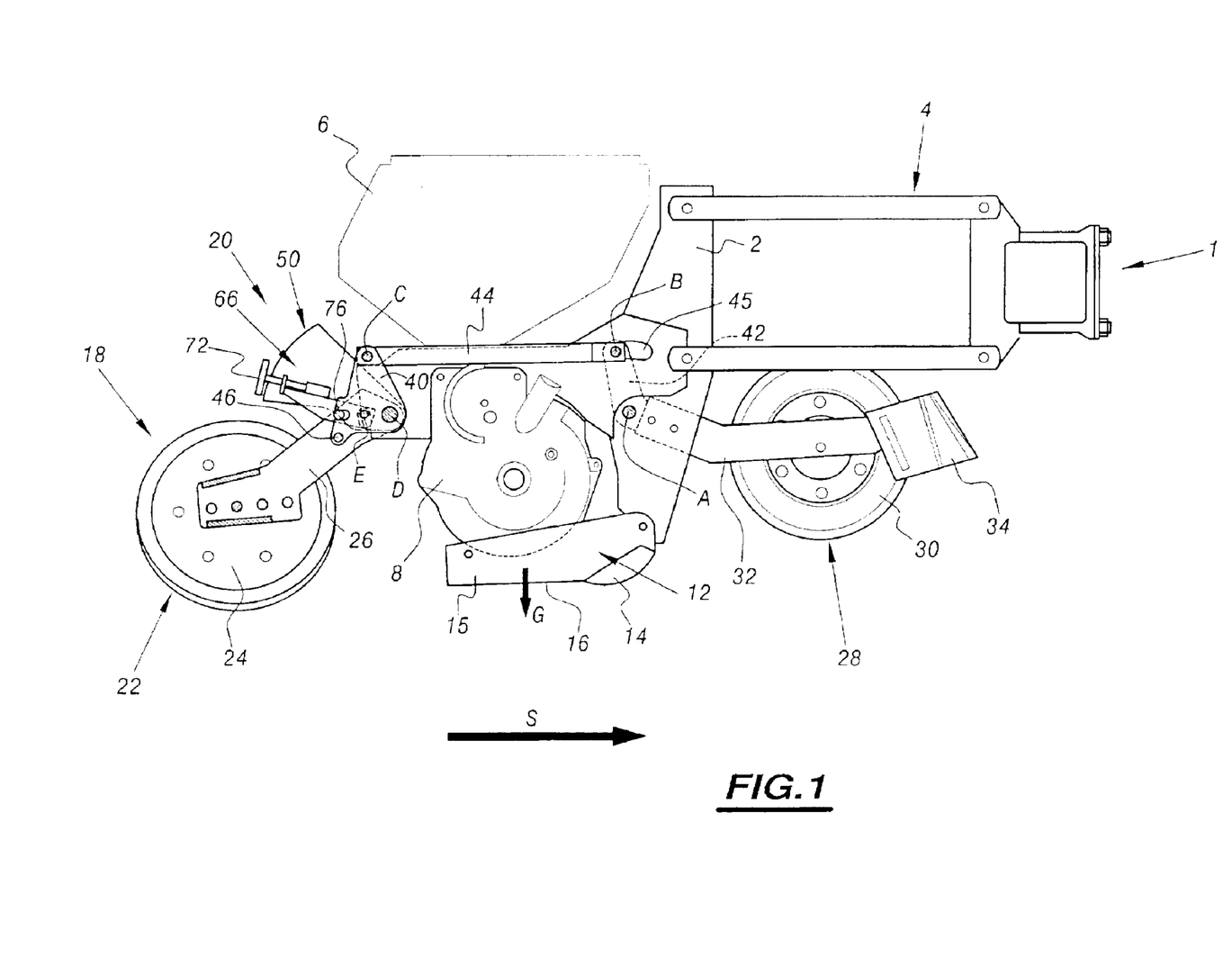
FIG. 1 is a diagrammatic view, partially in longitudinal section, showing a seed drill element of the invention.

FIG. 1 shows a seed drill element 1 essentially comprising:

- a frame 2 having means 4 disposed thereon for fixing to a chassis (not shown) and serving to pull the following element in a travel direction represented by arrow S;
- a tank 6 for containing seeds, commonly referred to a hopper;
- a seed dispenser 8 in the form of a single-seed pneumatic device adapted to recover one seed at a time from the tank 6 by suction and then to allow the seed to fall in the direction represented by arrow G;
- a member 12 for opening a furrow in the ground, constituted by a V-shaped coulter 14 extended by two plates 15 converging downwards towards each other, without meeting and adapted both to leave a passage 16 between them for guiding seeds coming from the dispenser 8 and to keep the furrow open immediately behind the coulter 14 so that the seeds drop down to the bottom of the open furrow; and
- means 18 enabling the frame 2 to press against the ground, together with topsoiling means 20, i.e. means for adjusting the depth of the furrow and described in greater detail below.

The seed tank 6, the dispenser 8, and the furrow-forming member 12 are fixed securely to the frame 2. The means 4 for fixing the frame to the above-mentioned chassis comprise firstly a hinged parallelogram allowing the seed drill element to move relative to the chassis in a vertical direction, and a bracket for securing the parallelogram to the chassis.

Figure 2A:
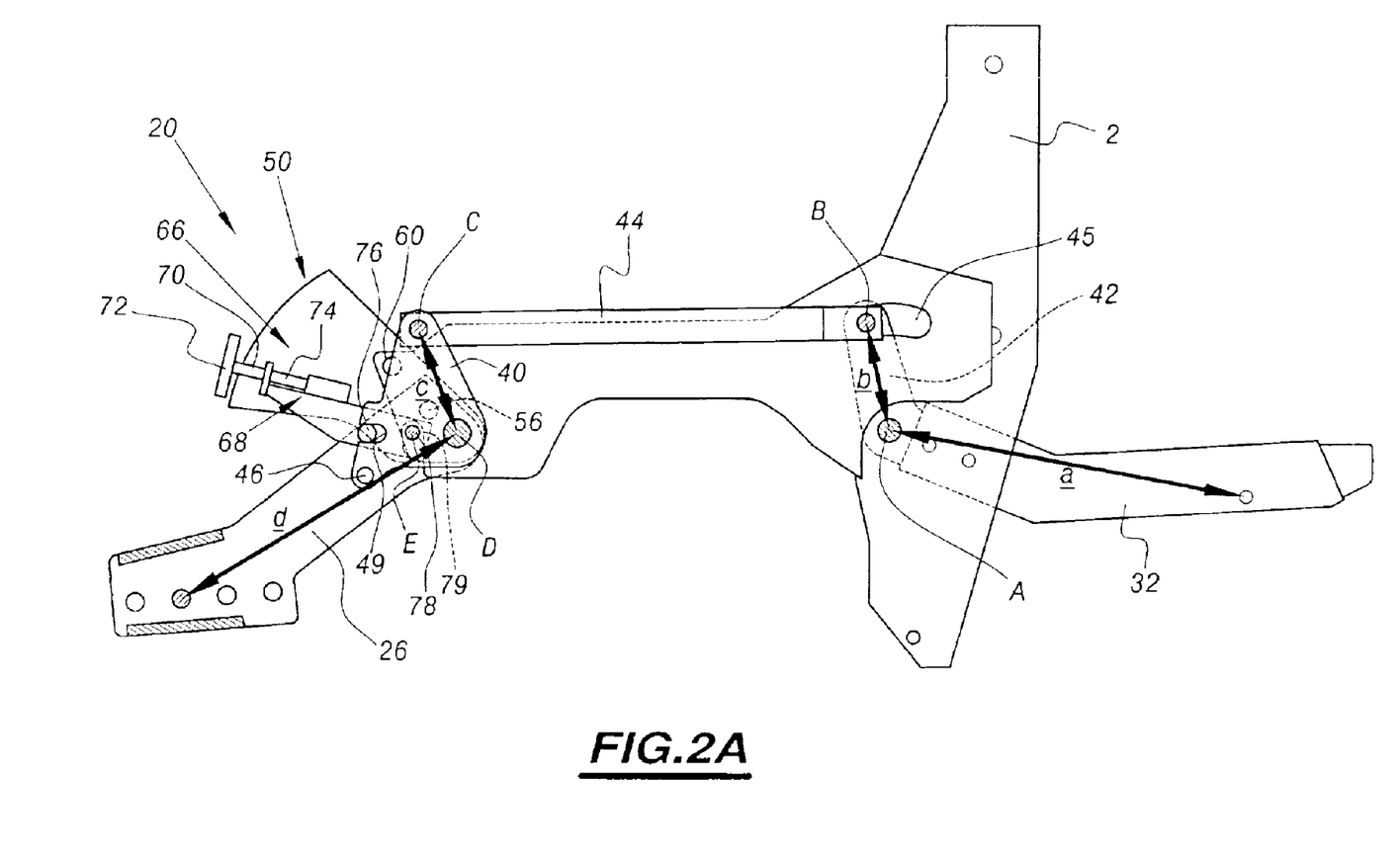
FIG. 2A is a view analogous to that of FIG. 1, on a scale larger than FIG. 1 and showing only a portion of the frame, of the presser means, and of the topsoiling means.
Figure 2B:
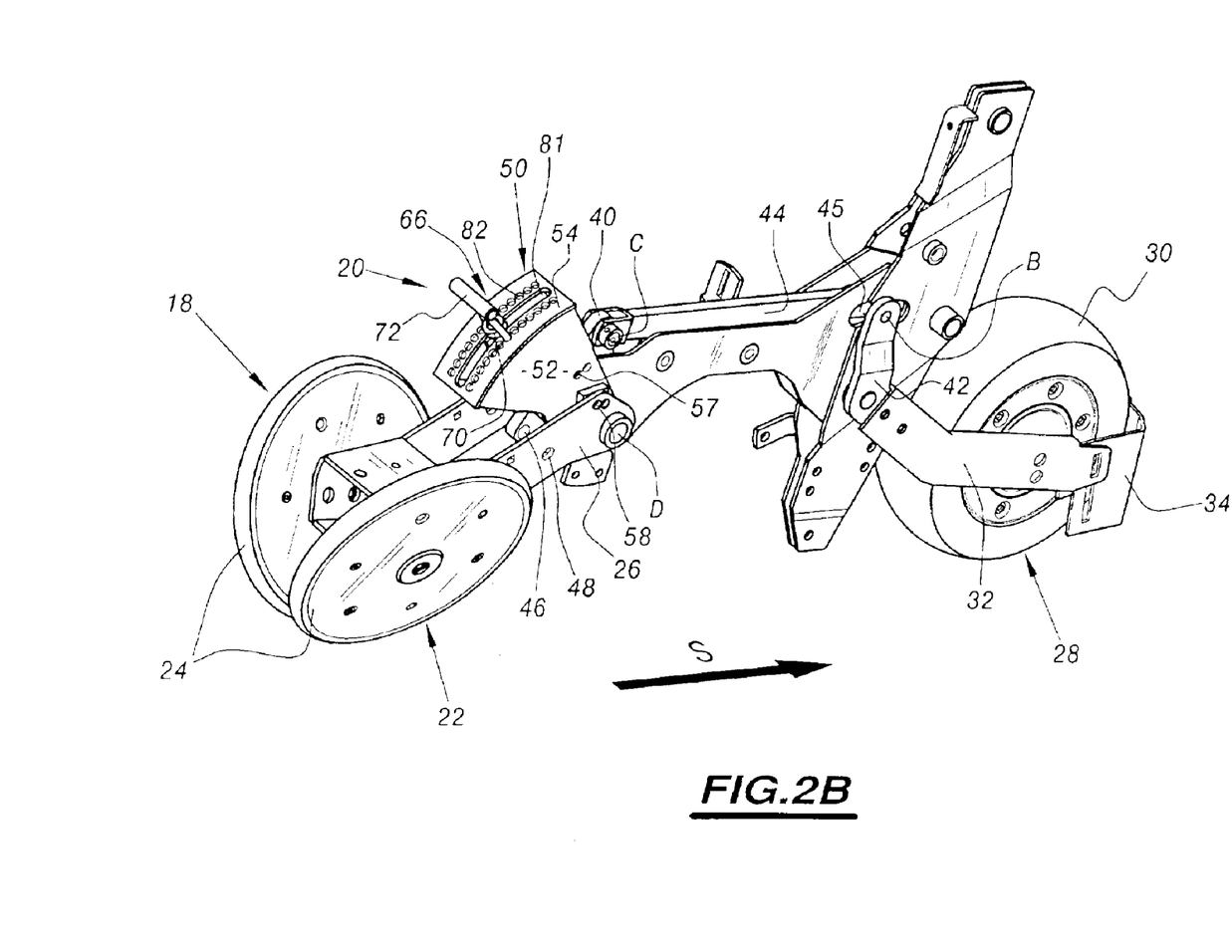
FIG. 2B is a perspective view of the seed drill element of FIG. 1 with only the frame, the ground presser means, and the topsoiling means being shown.

Only the frame 2, the presser means 18, and the topsoiling means 20, which are shown in greater detail in FIGS. 2A and 2B, are described in greater detail below, it being understood that the other members can be embodied in a variety of ways. Thus, by way of non-limiting example, the pneumatic dispenser 8 may be replaced by a mechanical dispenser; similarly, the coulter 14 may be associated with or replaced by one or more furrow-opening disks.

The means 18 for pressing the frame against the ground are adapted in particular to ensure that the seed drill element 1 is stable in a transverse direction on the ground. The topsoiling means 20 are adapted to impose an adjustable depth to the furrow so as to ensure that the seeds sown are buried to a greater or lesser depth.

The topsoiling means 20 can be configured in three different ways, depending on whether the desired topsoiling is controlled from the front (FIGS. 3A and 3B), in particular when sowing beet seeds, from the rear (FIGS. 4A and 4B), in particular when sowing maize (corn) seeds, or by means of a rocker (FIGS. 5A and 5B), in particular when sowing on ground that is very irregular.

As shown in FIG. 2B, the ground presser means 18 comprise a rear block 22 constituted by a pair of rear wheels 24 mounted on a common hub and inclined relative to a vertical plane so as to form a V-shape with its point directed towards the ground, and also by a generally U-shaped rear arm 26 connecting the common hub of the wheels 24 to the frame 2. The arm 26 is hinged to the frame about a pivot connection on an axis referenced D which is spaced apart from the point of the arm that is connected to the hub of the wheels by a distance referenced d in FIG. 2A. The rear wheels 24 are adapted to close the furrow opened by the member 12, by pushing over and compacting the earth displaced on either side of the coulter 14 as the seed drill element moves over the ground.

The ground presser means 18 also comprise (as a main component in the front and rocker topsoiling configurations, and as an optional component in the rear topsoiling configuration), a front block 28 formed by a wheel 30 and a pair of front arms 32 constituting a generally U-shape connecting the hub of the wheel 30 to the frame 2. The arms 32 are hinged to the frame about a pivot connection, having an axis referenced A and spaced apart from the connection between the wheel hub and the arm by a distance a, which distance is advantageously substantially equal to the distance d. The hinge axes A and D are disposed in such a manner as to be substantially symmetrical about the midplane of the seed dispenser 8. The front wheel 30 is selected to be wide enough to compact the ground prior to a furrow being opened by the coulter 14.

The front block 28 includes a clod-guard 34 fixed to the front end of the arm 32 so as to project ahead of the wheel 30 and move clods or large stones out of the way.

In addition, the topsoiling means 20 include a linkage adapted to impose a height relative to the frame 2 either on the rear wheels or on the front wheels, or else to impose a difference in height between the front and rear wheels. This linkage is shown in detail in FIG. 2A and comprises:

- a rear link 40 hinged to the frame 2 about the hinge axis D;
- a pair of front links 42 hinged to the frame 2 about the hinge axis A; and
- an intermediate link 44 connecting the rear link 40 to the front links 42, the rear link 40 being hinged at one end to the link 44 via a pivot connection on an axis C, and the front links 42 being hinged to the other end of the link 44 via a pivot connection on an axis B.

The hinge axes C and B are free relative to the frame 2, for example the hinge axis B can be received in a through slot 45 made in the frame 2 and extending substantially in the travel direction S. In addition, the distance b between the axes A and B and is advantageously substantially equal to the distance c between the axes C and D.

The rear link 40 is provided with a through hole 46 (FIG. 2A) situated facing the rear arm 26. This hole 46 is adapted to be placed facing a pair of through holes 48 (FIG. 4B) formed facing each other in the branches of the rear arm 26 when the topsoiling means 20 are in the rear topsoiling configuration.

In addition, a slot 49 is formed through the rear portion of the link 40, this slot opening out towards the rear of the seed drill element.

The topsoiling means 20 also comprise a U-shaped part 50 whose branches 52 extend on either side of the rear link 40 and whose web 54 carries a convex outside face. The branches 52 are hinged to the frame 2 about the hinge axis D and include at least two pairs of facing holes 56, 57. Each of the holes 56 (FIG. 2A) is adapted to face a corresponding hole 58 (FIGS. 2B and 5B) formed in the rear arm 26 while the topsoiling means are in the rocker topsoiling configuration. The holes 57 (FIGS. 3B and 4B) are adapted to face a corresponding hole 60 (FIG. 2A) formed in the frame 2 when said means are in the front or rear topsoiling configuration.

The topsoiling means 20 also have selective locking means for locking the rear arm 26 to the rear link 40, the part 50 to the frame 2, and the rear arm 26 to the part 50, depending on whether the topsoiling means are in the front, rear, or rocker topsoiling configuration. More precisely, at least one peg or screw 61 is provided to be received inside the holes 57 and 60, thereby locking the part 50 to the frame 2, as shown in the exploded views of FIGS. 3B and 4B. Similarly, a locking rod 62 is provided to be received in the holes 46 and 48, thereby locking the rear link 40 to the rear arm 26, as shown in exploded view in FIG. 4B. At least one peg or screw 63 is provided to be received in the holes 56 and 58, thereby locking the part 50 to the rear arm 26, as shown in exploded view in FIG. 5B.

The seed drill element 1 also comprises an adjustment mechanism 66 comprising a lever 68 hinged to the part 50 via a pivot connection of axis E, the lever extending substantially between the branches 52 of the part 50. More precisely, the lever 68 is made up of two symmetrical prongs 70 connected together at their rear end by means of a handle 72 and connected to each other in their middle portions by a slider 74 that is extended forwards by a structure provided at its front end with a cross bar and with a transverse rod 78 forming the hinge axis E. The bar 76 bears against the rear portion of the rear link 40, extending inside the slot (FIG. 2A) and the rod 78 is housed in an oblong hole 79 formed through the rear link.

The slider 74 is movable in a slot 81 extending along the convex web 54 of the part 50, and the front portions of the prongs 70 are adapted to be received in perforations 82 (FIG. 2B) formed through the web 54 of the part 50 so as to secure the lever 68 in releasable manner to the part 50, thereby forming a kind of reference part. The perforations 82 are in the form of two symmetrical rows extending along the length of the outside face of the web 54 substantially parallel to the slot 81 so that each prong 70 can be fixed in one of the holes in each row. The two fixing holes for the prongs 70 can be selected either so that one faces the other, or else so that one is offset relative to the other, which amounts to being able to determine the position of the lever 68 relative to the reference piece 50 either stepwise going from one pair of facing holes to the pair situated immediately above it or below it, or else in half-steps by changing only one of the fixing holes on each adjustment step.

The seed drill element 1 operates as follows:

In all three possible topsoiling configurations, the seed drill element 1 is driven, possibly together with other elements in parallel therewith, by a suitable vehicle, for example an agricultural tractor. The seed dispenser 8 delivers one seed at a time from the tank 6 at regular intervals to the passage 16 formed immediately behind the furrow-forming coulter 14.

The depth of the furrow is determined by the topsoiling means 20.

Figure 3A:
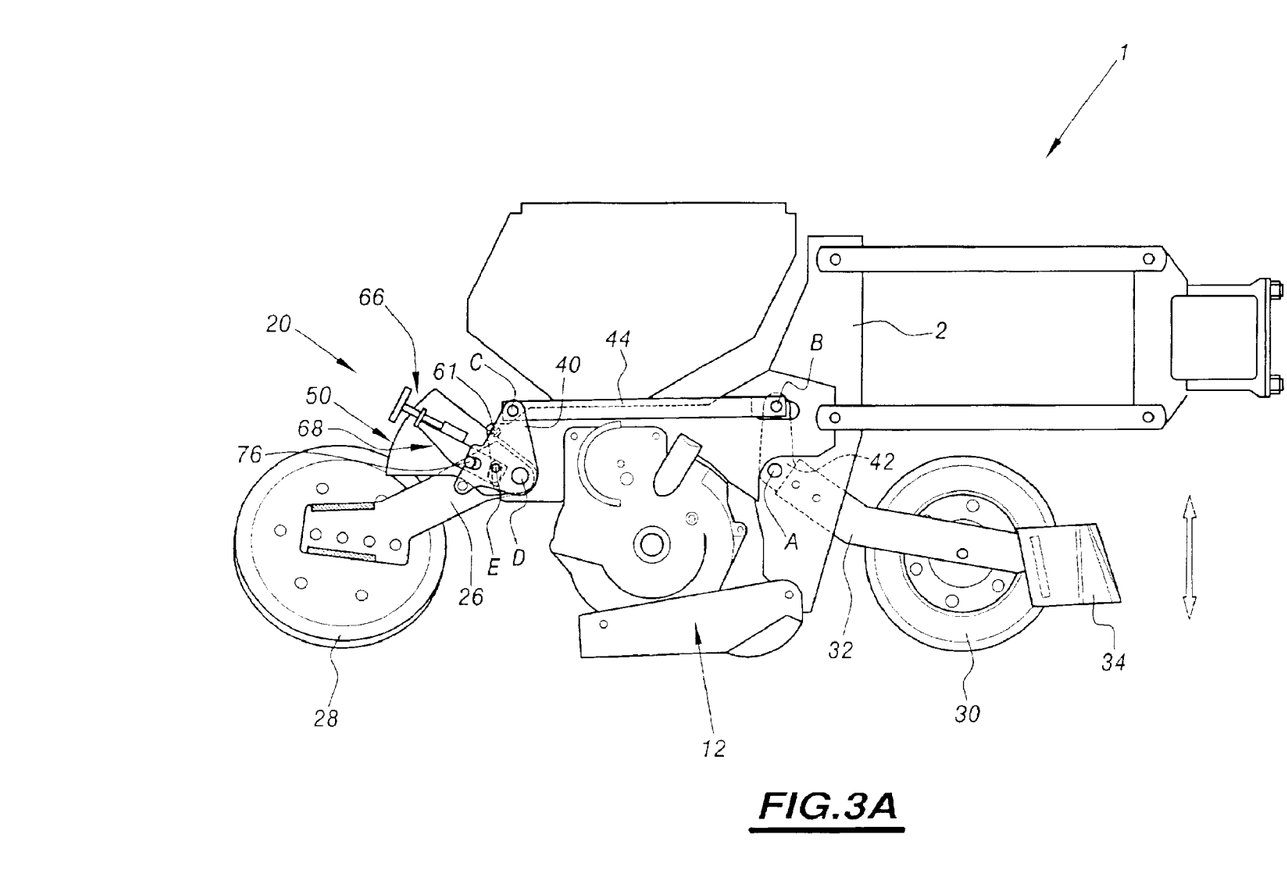
FIGS. 3A and 3B show the front topsoiling configuration of the seed drill element of the invention, FIG. 3A being a view analogous to FIG. 1, and FIG. 3B being a view analogous to FIG. 2B.
Figure 3B:
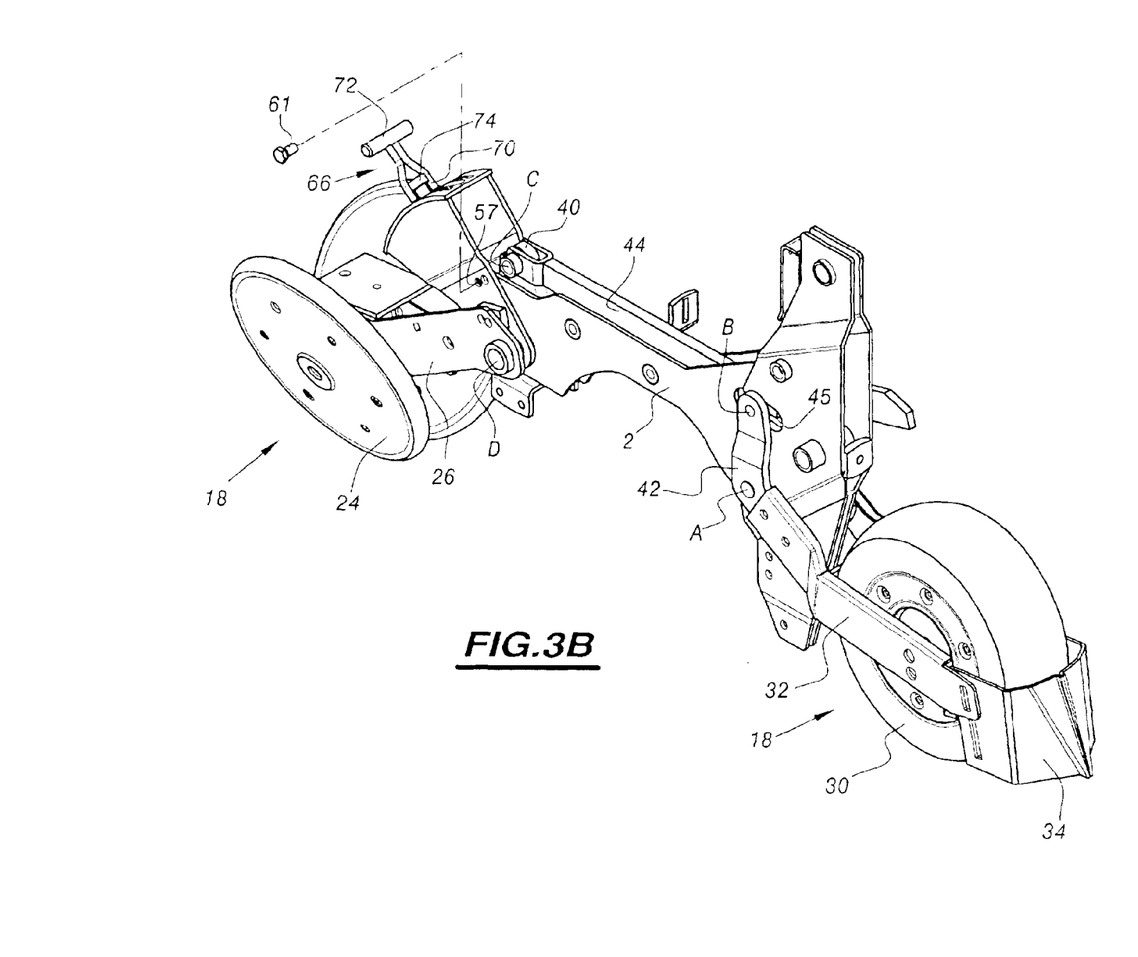

When these means are in their front configuration, as shown in FIGS. 3A and 3B, only the reference part 50 is locked to the frame 2 by means of one or two pegs 61 received or screwed into the hole 57 and the hole 60 so that the rear wheel 24 is freely hinged relative to the frame 2 via its hinge axis D. By acting manually on the handle 72 to move the slider 74 in the slot 81 so as to pivot the lever 68 about the axis E, the bar 76 moves the link 40 about the pivot D so that the intermediate link 44 is moved in a direction substantially parallel to the travel direction S of the seed drill element, the hinge axis B being moved inside the groove 45 so as to describe a circular arc of radius b centered on the axis A as imposed by the front links 42. In reaction to these front links 42 hinged at B, the front arms 32 pivot about the hinge axis A so that the front wheel 30 is moved substantially vertically upwards or downwards. The difference in height between the level at which the front wheel 30 presses against the ground and the level at which the coulter 40 presses against the ground can thus be adjusted, in particular to comply with specifications concerning the depth at which the seeds being sown should be buried.

The pivot angle of the lever 68 is indexed in accurate manner relative to the reference piece 50 and thus relative to the frame 2 by locking the prongs 70 in two perforations 82 of the reference part 50 once the desired adjustment has been achieved.

Figure 4A:
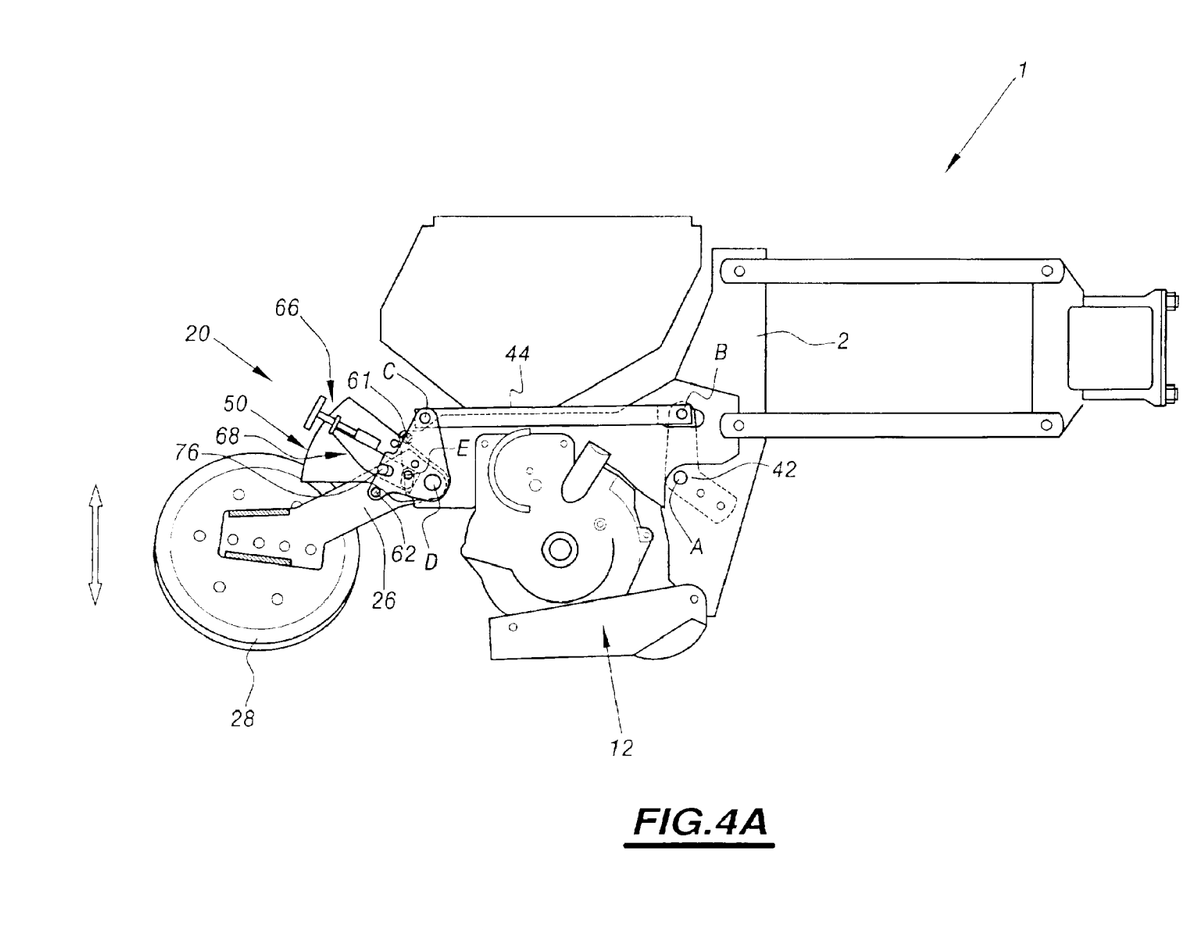
FIGS. 4A and 4B show the rear topsoiling configuration of the seed drill element of the invention, FIG. 4A being a view analogous to FIG. 1, and FIG. 4B being a view analogous to FIG. 2B.
Figure 4B:
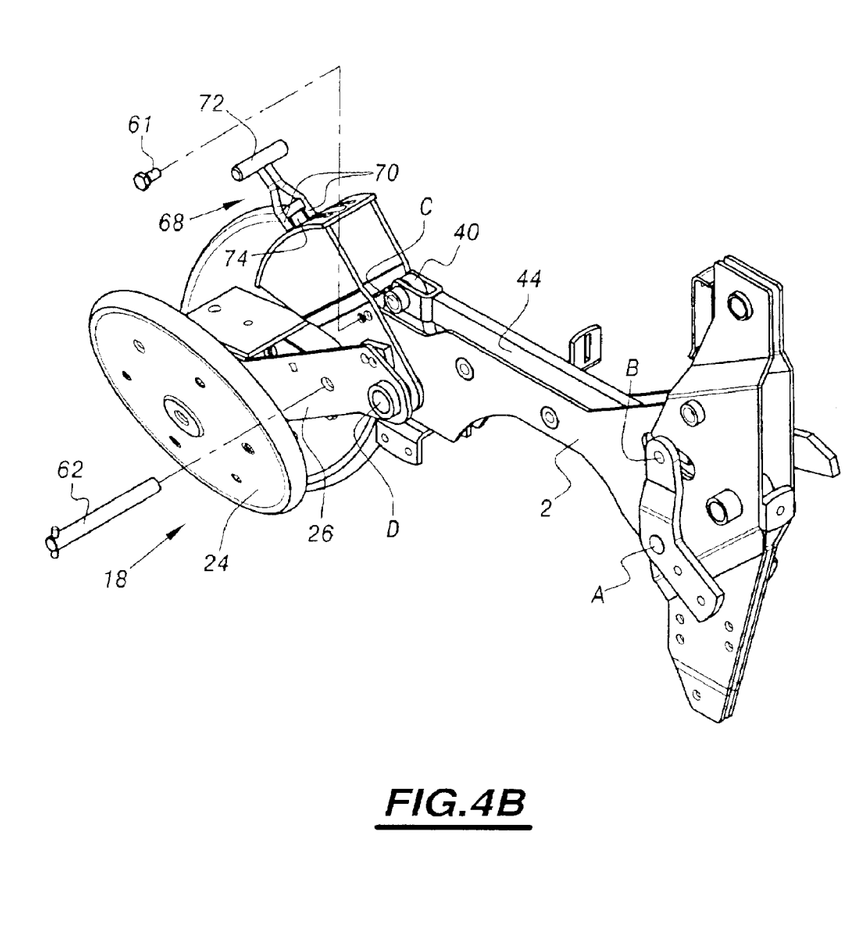

When the topsoiling means are in the rear topsoiling configuration, as shown in FIGS. 4A and 4B, the locking of the part 50 to the frame 2 as used in the preceding configuration is maintained, and the rear arm 26 is locked to the rear link 40 by means of the locking rod 62 received in the holes 46 and 48, such that the assembly comprising the rear arm 26 and the rear link 40 is hinged to the frame 2 about the axis D, which assembly should be considered as a single entity in this configuration. The front block 28 is then optional and can be removed, as shown, or left to float completely freely. By acting on the handle 72 to pivot the lever 68 about the axis E, the bar 76 of the lever causes the link 40 to pivot about the axis D so that the point connecting the hub of the rear wheels 24 to the rear arm 26 is moved substantially vertically upwards or downwards. The difference in height between the level at which the rear wheels 24 press against the ground and the level at which the coulter 14 presses against the ground can thus be adjusted, with the pivot angle of the lever 68 being indexed in accurate manner relative to the reference part 50, and thus relative to the frame 2.

Figure 5A:
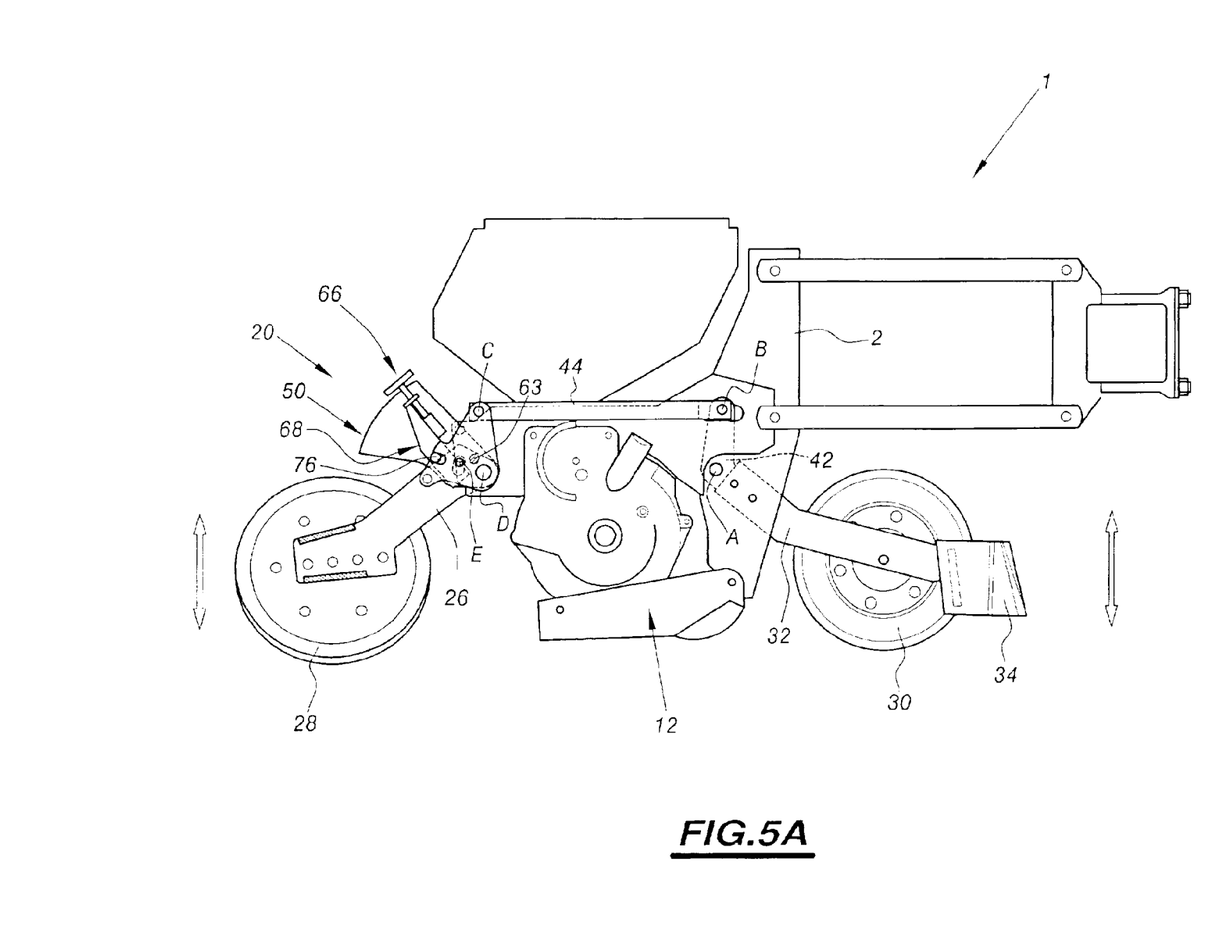
FIGS. 5A and 5B show the rocker topsoiling configuration of the seed drill element of the invention, FIG. 5A being a view analogous to FIG. 1, and FIG. 5B being a view analogous to FIG. 2B.
Figure 5B:
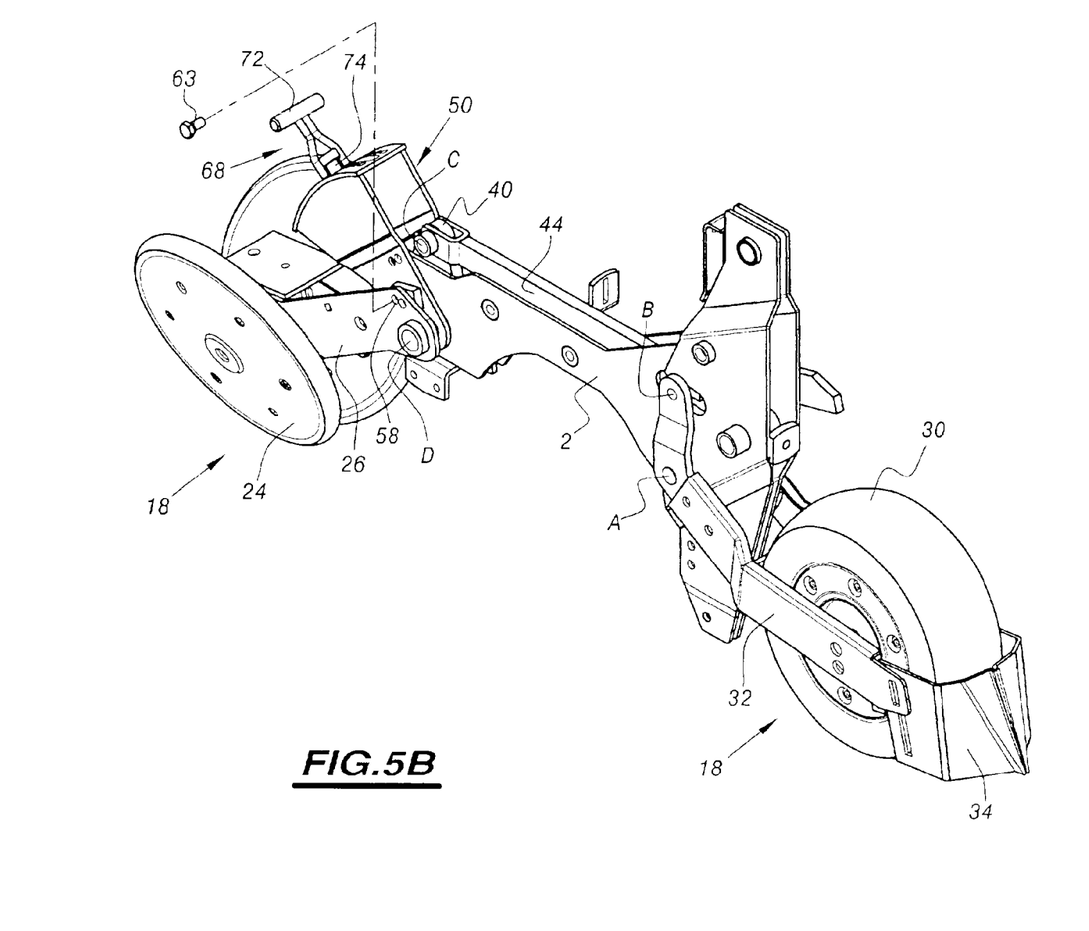

When the topsoiling means are in the rocker topsoiling configuration, as shown in FIGS. 5A and 5B, both of the two locking configurations described above are undone, and the rear arm 68 is locked to the reference part 50 by means of one or more pegs 63 received or screwed in the hole 56 and the hole 58. In substantially the same manner as in the front topsoiling configuration, pivoting the lever 68 about its axis E causes the following in succession: the link 40 to pivot about the hinge axis D; the intermediate link 44 to move in substantially rectilinear manner; and the front arms 32 to pivot about the hinge axis A. However, unlike the front topsoiling configuration, pivoting the lever 68 relative to the reference part 50 does not amount to pivoting relative to the frame 2, but instead relative to the rear arm 26, so that in substantially the same manner as in the rear topsoiling configuration, pivoting the lever 68 about the hinge axis E causes the link 40 to pivot about the axis D and thus causes the rear arm 26 to be moved upwards or downwards. Pivoting the lever 68 thus causes the relative inclination between the front and rear portions 28 and 22 to be varied, thereby modifying the difference in height between the front wheel 30 and the rear wheels 24 as a function of the pivot angle imparted to the lever which is indexed relative to the reference part 50.

The seed drill element of the invention thus enables all three possible topsoiling techniques to be implemented without requiring the general structure of the element to be modified. Topsoiling depth is easily set, even when a group of seed drill elements are mounted on the same chassis.

Another advantage of the seed drill element of the invention consists in its high degree of stability since the structure described makes it possible simultaneously to have front and rear arm lengths a and d relative to the hinge axes A and D that are practically equal, and also front and rear link lengths b and c relative to the same hinge axes A and D that are likewise substantially equal. Similarly, since the hinge axes A and D are situated symmetrically about the midplane of the seed dispenser 8, the mechanical equilibrium of the seed drill element is further enhanced.

In a variant, a plurality of holes 57 and/or a plurality of holes 58 may be provided for each flank of the seed drill element. When the branches 52 of the reference part 50 have a plurality of holes 57 (e.g. two such holes), a plurality of positions (e.g. two) are available for locking the part 50 to the frame 2 by means of one or more pegs or screws 61, thus making it possible to have either a plurality (e.g. two) of ranges for adjusting the height of the front block 20 relative to the frame 2 in the front topsoiling configuration, or else a plurality (e.g. two) of ranges for adjusting the height of the rear block 22 relative to the frame in the rear topsoiling configuration. Similarly, when a plurality of holes 58 are provided in the rear arm 26, the rear arm can be locked in a plurality of positions on the rear link 40 by means of pegs or screws 63, thus making it possible to have a plurality of adjustment ranges in the rocker topsoiling configuration.

What is claimed is:

1. A seed drill element for mounting on a chassis for driving relative to the ground, the element being of the type comprising:

a frame for fixing to the drive chassis;

a seed tank;

a seed dispenser;

a member for opening a furrow in the ground, said member guiding seeds coming from the dispenser to the bottom of the furrow;

means for pressing on the ground and comprising a rear block and a front block, each block having at least one wheel together with at least one arm hinged to the frame and connecting said at least one wheel to the frame; and topsoiling means comprising at least one rear link and at least one front link hinged relative to the frame together with an intermediate link interconnecting the front and rear links, wherein the topsoiling means further comprise a mechanism for moving the rear link relative to a reference part connected to the frame, and wherein the element includes means for selectively locking the rear arm to the rear link, the reference part to the frame, or the rear arm to the reference part, such that that when the reference part is locked to the frame and the rear arm is locked to the rear link, the topsoiling means are in a rear topsoiling configuration, and when the rear arm is locked to the reference part, the topsoiling means are in a rocker topsoiling configuration.

2. A seed drill element according to claim 1, wherein by locking the reference part to the frame, the topsoiling means are put into a front topsoiling configuration.

3. A seed drill element according to claim 1, wherein the selective locking means include pegs or the like suitable for being removably received in corresponding holes formed in the rear arm, the rear link, the reference part, and the frame.

4. A seed drill element according to claim 1, wherein the displacement mechanism includes a lever hinged relative to the reference part and adapted to cause the rear link to pivot about its hinge axis connecting it to the frame.

5. A seed drill element according to claim 4, wherein the position of the lever relative to the reference part is indexed by means of perforations formed in a face of the reference part.

6. A seed drill element according to claim 5, wherein the lever comprises a peg of prongs suitable for being received in two of the perforations of the reference part, said two perforations either facing each other or being offset relative to each other.

7. A seed drill element according to claim 1, wherein the distance between the hinge axis connecting said at least one rear arm to the frame and the point of connection between said at least one rear wheel to said at least one rear arm is substantially equal to the distance between the hinge axis connecting said at least one front arm to the frame and the point of connection between said at least one front wheel to the front arm.

8. A seed drill element according to claim 1, wherein the distance between the hinge axis connecting the rear link to the frame and the hinge axis connecting the rear link to the intermediate link is substantially equal to the distance between the hinge axis connecting the front link to the frame and the hinge axis connecting the front link to the intermediate link.

9. A seed drill element according to claim 1, wherein the hinge axis connecting said at least one rear arm to the frame and the hinge axis connecting said at least one front arm to the frame are at substantially the same distance from the vertical axis of the seed dispenser.

10. A seed drill element for mounting on a chassis for driving relative to the ground, the element being of the type comprising:
- a frame for fixing to the drive chassis;
- a seed tank;
- a seed dispenser;
- a member for opening a furrow in the ground, said member guiding seeds coming from the dispenser to the bottom of the furrow;
- means for pressing on the ground and comprising a rear block or a front block, each block having at least one wheel together with at least one arm hinged to the frame and connecting said at least one wheel to the frame; and
- topsoiling means comprising at least one rear link and at least one front link hinged relative to the frame together with an intermediate link interconnecting the front and rear links,
- wherein the topsoiling means further comprise a mechanism for moving the rear link relative to a reference part connected to the frame, and
- wherein the element includes means for selectively locking the rear arm to the rear link, the reference part to the frame, or the rear arm to the reference part, such that when the reference part is locked to the frame and the rear arm is locked to the rear link, the topsoiling means are in a rear topsoiling configuration, and when the rear arm is locked to the reference part, the topsoiling means are in a rocker topsoiling configuration.

11. A seed drill element according to claim 10, wherein the selective locking means include pegs or the like suitable for being removably received in corresponding holes formed in the rear arm, the rear link, the reference part, or the frame.

* * * * *